(12) United States Patent
AlShareef

(10) Patent No.: US 11,814,303 B2
(45) Date of Patent: Nov. 14, 2023

(54) UTILIZING CONCENTRATED SOLAR POWER FOR WATER-OIL SEPARATION

(71) Applicant: SAUDI ARABIAN OIL COMPANY, Dhahran (SA)

(72) Inventor: Malik Abdulqader M. AlShareef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/654,641

(22) Filed: Mar. 14, 2022

(65) Prior Publication Data
US 2023/0286832 A1 Sep. 14, 2023

(51) Int. Cl.
*C02F 1/24* (2023.01)
*C02F 1/40* (2023.01)
*C02F 1/14* (2023.01)
*B01D 17/02* (2006.01)
*C02F 103/10* (2006.01)
*C02F 101/32* (2006.01)

(52) U.S. Cl.
CPC ............ *C02F 1/24* (2013.01); *B01D 17/0205* (2013.01); *C02F 1/14* (2013.01); *C02F 1/40* (2013.01); *C02F 2101/32* (2013.01); *C02F 2103/10* (2013.01); *C02F 2201/009* (2013.01); *C02F 2301/046* (2013.01)

(58) Field of Classification Search
None
See application file for complete search history.

(56) References Cited

U.S. PATENT DOCUMENTS

| 4,525,242 | A | * | 6/1985 | Iida | ........................... C02F 1/14 202/180 |
| 4,783,268 | A | | 11/1988 | Leung | |
| 9,839,918 | B2 | | 12/2017 | Park et al. | |
| 10,086,315 | B2 | * | 10/2018 | Richerand, Sr. | .......... C02F 1/40 |
| 10,093,554 | B2 | * | 10/2018 | Park | ................... B01D 21/0084 |
| 10,597,313 | B2 | | 3/2020 | Raynel et al. | |
| 10,703,644 | B2 | | 7/2020 | Younes et al. | |
| 10,773,974 | B2 | | 9/2020 | Groen et al. | |
| 10,934,189 | B2 | | 3/2021 | Burney et al. | |

(Continued)

FOREIGN PATENT DOCUMENTS

CA 2979197 C 4/2020
SU 1613435 A1 12/1990
(Continued)

*Primary Examiner* — Krishnan S Menon
(74) *Attorney, Agent, or Firm* — Osha Bergman Watanabe & Burton LLP

(57) ABSTRACT

Systems and processes for water-oil separations include feeding an oil-water mixture to an inlet of a water-oil separation vessel for separation of the decontaminated water from the oil. Steam bubbles are used to facilitate the separations, where the systems and processes include a water circulation loop for circulating a portion of the decontaminated water through the water circulation loop and heating the water to generate steam via solar energy captured by the concentrated solar collector. The steam may then be fed to a distributor in a separation chamber of the water-oil separation vessel, the distributor distributing the steam in the separation chamber of the water-oil separation vessel as a plurality of bubbles, facilitating separation of oil from water.

16 Claims, 3 Drawing Sheets

(56) References Cited

U.S. PATENT DOCUMENTS

| | | |
|---|---|---|
| 2012/0285892 A1 | 11/2012 | Tuckett et al. |
| 2013/0075098 A1 | 3/2013 | Janjua et al. |
| 2018/0023804 A1 | 1/2018 | Qin et al. |
| 2019/0291020 A1* | 9/2019 | Qin ...................... B01D 1/0058 |
| 2021/0107806 A1 | 4/2021 | St. John et al. |

FOREIGN PATENT DOCUMENTS

| | | |
|---|---|---|
| WO | 2002010073 A1 | 2/2002 |
| WO | 2017207527 A1 | 12/2017 |

\* cited by examiner

UTILIZING CONCENTRATED SOLAR POWER FOR WATER-OIL SEPARATION

FIELD OF THE DISCLOSURE

Embodiments of the present disclosure generally relate to utilizing Concentrated Solar Power (CSP), such as through parabolic trough collectors (thermal collector field) to generate steam, which is then used as a floatation gaseous media for oil-water separation.

BACKGROUND

Dissolved gas flotation (DGF) and Induced Gas Flotation (IGF) are water treatment processes used to clarify wastewaters or other waters by the removal of suspended matter, such as oil or solids. Special pumps are used in DGF and IGF processes to generate bubbles to be injected inside the separator vessel, such as air or nitrogen bubbles that are used to facilitate the flotation and separation of the oil or solids. The process as described in U.S. Pat. No. 10,086,315, for example, utilizes specialized two-phase pumps to create micro-bubbles to accelerate the lift necessary for separation of fine oil droplets. These specialized pumps used in DGF and IGF, however, are costly and difficult to maintain.

SUMMARY OF THE CLAIMED EMBODIMENTS

In one aspect, embodiments disclosed herein relate to a system for water-contaminant separations, such as water-oil separations, where the contaminant is lighter or less dense than water. The system may include a water-oil separation vessel including: a contaminated water inlet, a decontaminated water outlet, and an oil outlet; a separation chamber; and a bubble distributor disposed within the separation chamber. A contaminated water feed pipe fluidly connecting a contaminated water source to the contaminated water inlet of the water-oil separation vessel may provide a feed to be decontaminated. The system may also include a water circulation loop, comprising: a fluid conduit for withdrawing decontaminated water from the water-oil separation vessel via the decontaminated water outlet; a heat exchange tube configured for heating water withdrawn via the decontaminated water outlet; a concentrated solar collector for directly or indirectly heating water in the heat exchange tube to produce steam; and a fluid conduit configured for transporting the produced steam from the heat exchange tube to the bubble distributor. A fluid conduit may also be provided for recovering separated oil.

In another aspect, embodiments disclosed herein relate to a process for water-contaminant (water-oil) separations using the system as described in the above paragraph. The process may include feeding an oil-water mixture to the water-oil separation vessel. Water may be circulated through the water circulation loop, heating the water to generate steam via solar energy captured by the concentrated solar collector. The steam may then be distributed into the separation chamber of the water-oil separation as a plurality of bubbles, facilitating separation of oil from water, facilitating recovery of a decontaminated water product stream and an oil product stream. A portion of the recovered decontaminated water in the decontaminated water product stream to the water circulation loop.

Other aspects and advantages will be apparent from the following description and the appended claims.

DETAILED DESCRIPTION

Figure 1:
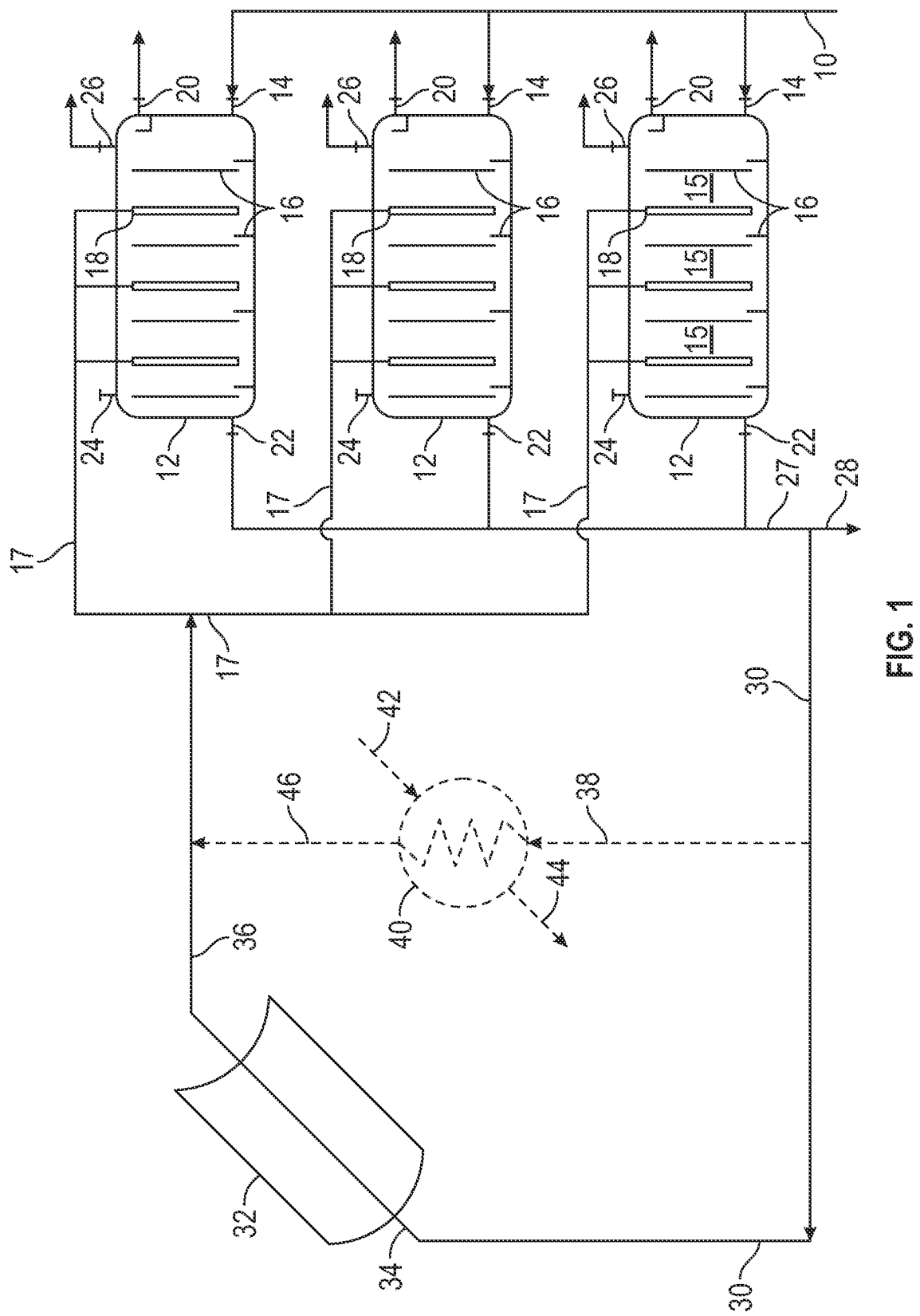
FIG. 1 is a simplified process flow diagram of a system for oil-water separations according to one or more embodiments disclosed herein.

Dissolved gas flotation (DGF) systems are used for fluid separation applications. The process floats solids, oils and other contaminants to the surface of liquids. Once these contaminants are on the surface they skimmed off and removed from the liquids. Oil and gas production facilities have used flotation systems to remove oil and solids from their produced and processed water.

Good separation are facilitated by both gravity and the creation of millions of very small bubbles. The larger and lighter the droplet, the faster it will rise to the surface. By attaching a small gas bubble to an oil droplet, the density of the oil droplet decreases, which increases the rise rate.

In contrast to the air or nitrogen gas flotation processes that are commonly used for oil-water separations at oil and gas production facilities, embodiments herein are directed toward the use of steam bubbles to facilitate the oil-water separations. Further, embodiments herein are directed toward the generation of the steam via concentrated solar power, providing a low operational cost, ecologically friendly method of separating oil and water.

Systems and processes herein are thus directed toward solar-plus-steam facilitated water-oil separations. A contaminated water, such as a produced water or a process water stream contaminated with oil or other contaminants may be fed to a gas flotation separator. Water may be heated, directly or indirectly, via concentrated solar power to produce steam. The steam may then be injected into the gas flotation separator to facilitate the separation of the oil or other contaminants from the water, resulting in an oil (contaminant) layer floating atop the water. The oil (contaminants) may then be recovered separately from the de-oiled water (decontaminated water).

Mixing of the steam bubbles and the produced water during the oil-water separations may result in the steam bubbles providing sufficient lift to oil droplets within the contaminated water, resulting in the desired separations. Mixing of the steam bubbles and the produced water may additionally result in condensation of a portion of the steam (water vapor). As it is generally desired to recover the oil as a liquid, significant heating of the contaminated water is not desired. Accordingly, a significant portion of the injected steam may condense during interaction with the produced water during the oil-water separations.

The steam generation and injection circuit may thus be a pseudo-closed loop water circuit. A portion of the produced water plus condensed steam may be recovered as a de-oiled (decontaminated) water product, which may be disposed of or re-used within the local facilities as desired. Another portion of the produced water plus condensed steam may be recirculated for continued steam generation and injection.

Concentrated solar power systems useful in embodiments herein may include various devices or systems useful for capturing and storing solar energy. For example, in one or more embodiments, solar power may be captured by utilizing mirrors or lenses to concentrate a large area of sunlight onto a receiver. Mirrors of different shapes may be used, a few non-limiting examples of which may be rectangular, curved (U-shaped), and a combination of smaller flat mirrors formed into a dish-shaped mirror. Such mirrors may be placed as tilted toward the sun and used to collect the sun's energy by focusing sunlight on tubes (or receivers) that run the length or any other dimension of the mirrors. The reflected sunlight may be used to heat a fluid, such as water, flowing through the tubes, to produce steam. Solar concentrating technologies may include parabolic troughs, dishes, linear Fresnel reflectors, or Solar Power Towers, among others.

In one or more embodiments, a parabolic trough or a parabolic dish may be used as solar collectors. In parabolic trough systems, receiver tubes are positioned along the focal line of each parabolic mirror. A parabolic solar thermal collector is straight in one dimension and curved in the other dimensions. The curvature may be a parabola in the other two dimensions and lined with a polished metal mirror.

In one or more embodiments, a linear Fresnel reflector systems may be used as solar collectors. In linear Fresnel reflector systems, one receiver tube may be positioned above several mirrors to allow the mirrors to have mobility in order to track the direction of the sun as it moves during the day. The sunlight which enters the mirror parallel to its plane of symmetry is focused along the focal line. The receiver tube transporting the fluid to be heated may be positioned along the same focal line for heating.

Such solar energy collectors may be used to directly or indirectly heat water to produce steam. As an example of "direct" use of solar energy to produce steam, water may be circulated through a receiver tube passing through a parabolic trough and heated via concentrated solar to produce steam.

As an example of an "indirect" use of solar energy to produce steam, an exchange medium may be circulated through a receiver tube passing through a parabolic trough and heated via concentrated solar to produce a heated exchange medium. The heated exchange medium may then be contacted in indirect heat exchange with water to produce steam. In some embodiments, the exchange medium may be a molten salt. Other exchange mediums known in the art may also be used.

Systems herein may include a cool exchange medium storage tank, a hot exchange medium storage tank, and associated pumps, piping, valves, etc., for controlling the circulation and usage of the exchange medium. For example, a parabolic trough collector may be used to heat a molten salt to a desired temperature, and the heated molten salt may be stored in the hot exchange medium storage tank for later use, such as during overnight hours. As the molten salt is cooled via contact with the water to produce steam, the molten salt may be transported to the cool exchange medium storage tank for later heating, such as during daylight hours. If the bulk molten salt temperature will remain sufficiently high to produce steam overnight, a single storage tank may also be used.

Embodiments herein may also use both direct and indirect solar heating to produce steam. Receiver tubes for both water heating and exchange fluid heating may be provided, thereby allowing direct heating of water via solar energy during daylight hours and indirect heating of water via solar energy during nighttime hours.

Referring now to FIG. 1, a simplified process flow diagram of embodiments of a system for integrating solar power with gas flotation is illustrated.

A contaminated water 10, such as a produced water from an oil well, containing water and oil, among other possible contaminants in the water, is fed to a water-oil separation unit 12. Depending upon the volume of water being separated, one or more separation units 12 may be provided, and may be arranged in series or in parallel as illustrated. The separation units 12 may include a contaminated water inlet 14, a separation chamber or chambers 15 including one or more weirs 16 to guide fluid flow and facilitate separation of the water from the oil, as well as steam distributors 18 for receiving a flow of steam via flow line 17. The separation unit 12 also includes an oil outlet 20 and a decontaminated water outlet 22. If necessary or desired, a vapor inlet 24 and a vapor outlet 26 may be provided, such as to provide a nitrogen or air blanket within the vessel.

The contaminated water 10 may be fed to inlet 14 of the separation unit 12. Steam 17 may be provided in some embodiments as a superheated steam. Saturated steam may also be used. The steam is distributed into the separation chamber, facilitating flotation and separation of the oil droplets from the water. The oil droplets accumulate toward a top of the separation chamber and are recovered via outlet 20, while the decontaminated water may be recovered via outlet 22. The steam, as noted above, may be distributed into the separation chamber as macro-bubbles, micro-bubbles, or both. As the steam bubbles rise within the fluid column, oil droplets may be carried along with the rising bubbles, the less dense oil agglomerating and accumulating atop the fluid column, traversing over the weirs and being recovered via outlet 20.

The decontaminated water recovered via outlets 22 may be combined in a water header 27. A portion of the decontaminated water may be recovered as a product stream 28, which may be disposed of in an environmentally friendly manner, or may be reused, such as for reinjection into a well or for other purposes at the site. A remaining portion of the decontaminated water may be used for steam generation in a water circulation loop.

The water circulation loop may include a water conduit 30, a heat exchange tube 34, a solar collector 32, as well as a steam conduit 36. Fluid conduit 30 may be provided for withdrawing decontaminated water received in header 27 from the separation unit outlets. The decontaminated water may then be circulated to heat exchange tube 34, a receiver tube for receiving concentrated solar energy from the solar collector 32, thereby heating the water to form steam. The steam may then be fed via flow line 36 to steam distribution header 17 and thence into the separation units 12, completing the pseudo-closed loop water circuit.

As noted above, as solar collectors may only be used for direct heating of water during daylight hours. If desired for continuous operations, including nighttime hours, a heat exchanger 40 may be provided to produce steam when the solar collectors are unavailable (nighttime, maintenance, periods of insufficient sunlight/weather). A hot heat exchange fluid 42 may be provided to the exchanger and contacted in indirect heat exchange with a water stream 38 to produce cooled exchange fluid 44 and steam 46, which may be fed to steam header 17.

Figure 2:
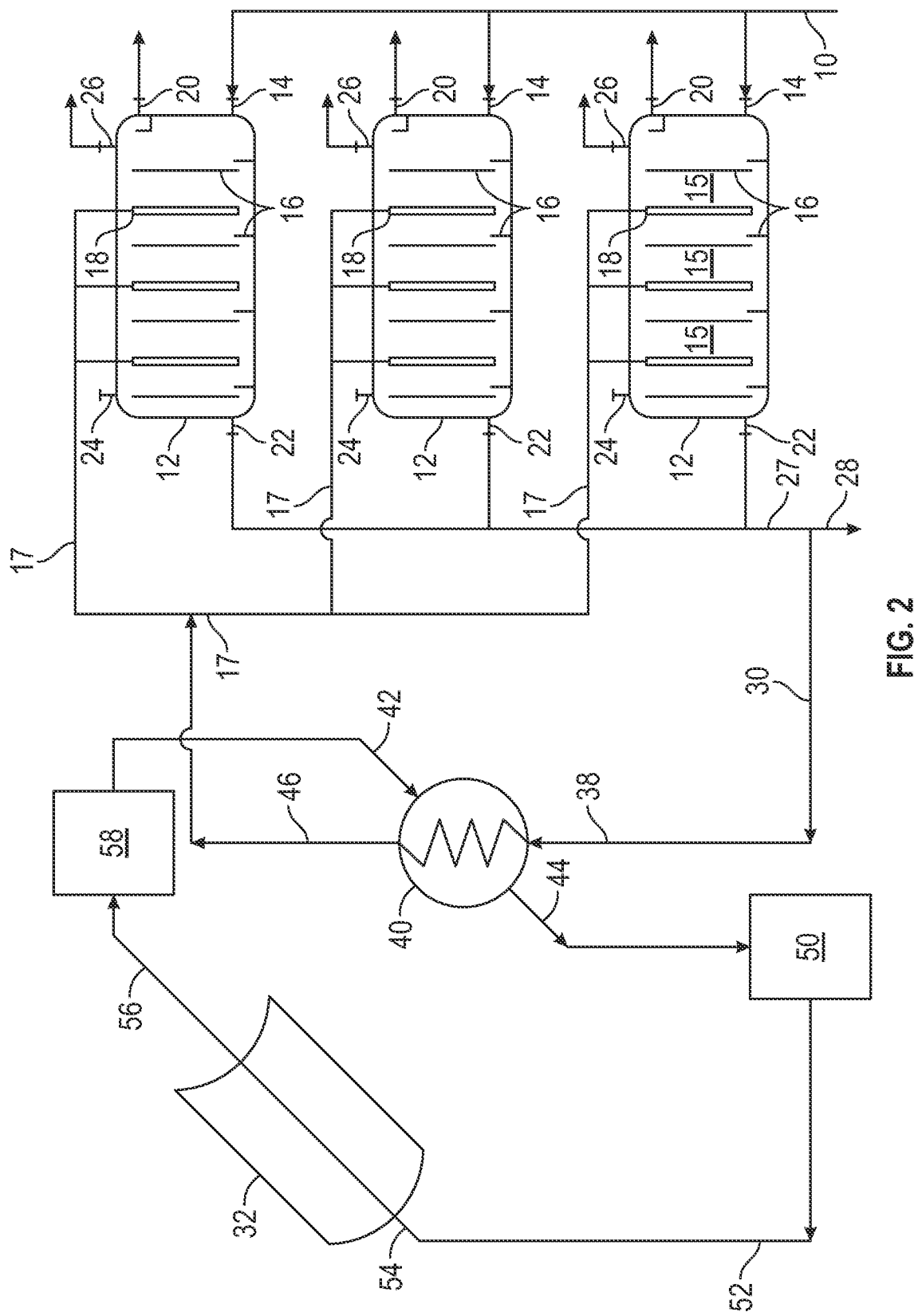
FIG. 2 is a simplified process flow diagram of a system for oil-water separations according to one or more embodiments disclosed herein.

Referring now to FIG. 2, a simplified process flow diagram of embodiments of a system for integrating solar power with gas flotation is illustrated, where like numerals represent like parts. In this embodiment, rather than heating the water to form steam directly using the solar collector, a molten salt circulation loop is provided to indirectly heat the water to produce steam with the solar energy provided by the collector. The molten salt circulation loop may include a cool molten salt tank 50 containing a supply volume of molten salt. The cool molten salt may then be circulated via flow line 52 to receiver tube 54 and heated via solar energy concentrated by solar collector 32, producing a heated molten salt. The heated molten salt is then fed via flow line 56 to heated molten salt supply tank 58, which may be used to store a sufficient volume of heated molten salt such that the system may be used during overnight hours. The heated molten salt may then be fed via flow line 42 and used to heat water stream 38 to form steam 46 supplied to steam header 17.

Figure 3:
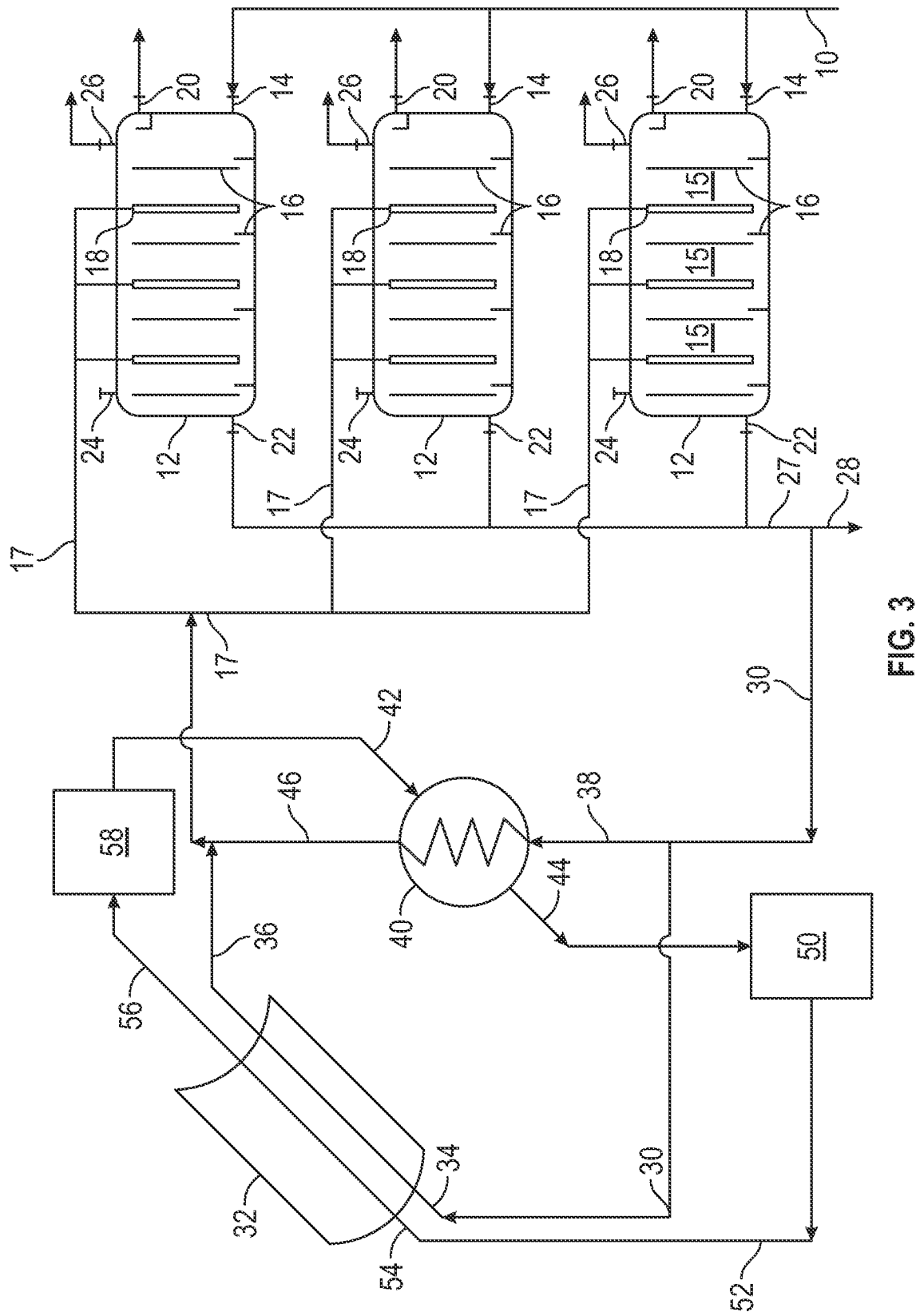
FIG. 3 is a simplified process flow diagram of a system for oil-water separations according to one or more embodiments disclosed herein.

Referring now to FIG. 3, a simplified process flow diagram of embodiments of a system for integrating solar power with gas flotation is illustrated, where like numerals represent like parts. In this embodiment, a receiver tube 34 is provided for heating of water to produce steam during daylight hours. Further, a receiver tube 54 is provided for heating of molten salt during daylight hours. The volume of heated molten salt in tank 58 may then be used to generate steam using exchanger 40 during nighttime hours. Depending upon the configuration and type, one or more solar collectors 32 may be provided.

In some embodiments, for example, oil droplets in the contaminated water may be about 60 microns in average diameter. A simple distributor introducing steam into the fluid column, introducing the steam at high pressure and high temperature, has been found by the present inventors to provide for performing the desired separations, reducing the oil content to ppm levels within the decontaminated water to meet disposal requirements or regulations. Steam bubbles may therefor negate the need for special bubble-forming pumps, which are expensive to operate and maintain.

Distributors useful for introducing the steam into the produced (contaminated) water may include perforated pipe distributors, perforated plate distributors, venturi distributors, nozzle type distributors, and other distributors as are known in the art. The orientation and arrangement of the distributors may be based upon the type of distributor to be used, as well as separation chamber size and configuration and other variables known known to one skilled in the art. The target steam bubble size introduced into the separation chamber via the distributor may depend upon the expected contaminant particle or droplet size, contaminant type, and amount of contaminant to be processed within the separator. Further, as steam is condensable, the steam pipes and distributors may include sloping, steam traps or other means for removing any liquid that may accumulate within the steam feed and distribution system.

In some embodiments, steam may be introduced macrobubbles (bubble diameter of greater than 0.1 mm, microbubbles (bubble diameter of 1 to 100 microns, or nanobubbles (less than 1 micron). In some embodiments, a plurality of distributors may be provided to introduce macro, micro, and/or nanobubbles into the separation system.

The dynamics within a steam bubble water-oil separation system are impacted not only by bubble size and interaction of the rising bubbles with the oil droplets and the mixing within the fluid column, but also by thermodynamics, as heat transfer from the bubbles to the bulk water may cause a rise in fluid column temperature and a consequent rise in oil solubility within the water. As to mixing and effect of the bubbles on separation, larger bubbles tend to rise faster within the water column, whereas smaller bubbles rise slower, allowing more time for contact of an oil droplet with the vapor bubble and to be carried with it. Further, some mixing within the system is desired, thereby allowing the oil droplets to contact and be provided an opportunity to agglomerate. However, intensive mixing is undesired, as this may decrease the oil separation efficiency. Heat transfer, on the other hand, may be more efficient with smaller bubbles, as providing a greater heat transfer surface area. Additionally, due to cooling of the rising steam bubbles within the fluid column and associated condensation of the steam within a bubble that may occur, the size, burst or collapse, and other aspects of the steam bubbles may be impacted, further affecting the dynamics (mixing, rise rate, etc.) of the bubbles within the system. Even though the dynamics of steam bubbles within a water-oil separator may be different than the dynamics of air or nitrogen bubbles within a water-oil separator, the use of steam may be at least as effective, and possibly more effective, than use of air bubbles.

In some embodiments, an initial separation stage may be provided with one of macro or micro/nano bubble generation, and a second separation stage may be provided with the other. In other embodiments, serial separation stages may be provided with distribution of both macro and micro or nano bubbles.

Serial separation stages, when used to effect the separation of oil from water according to some embodiments herein using steam bubble generation, for example, may be provided with heat exchangers for cooling of the contaminated water upstream of an initial separation stage, cooling of the contaminated water between separation stages, or both. Further, the steam temperature, flow rate, and pressure used for each separation stage may be the same or different. Single separation stages may also be provided with a water loop for cooling the water and effecting temperature control of the water within the separator chamber.

In contrast to other gas flotation methods using air, embodiments herein utilize steam bubbles to facilitate the oil-water separations. The steam may be hotter than the produced water being fed to the separation units, and as noted above, a liquid oil product is targeted for recovery. In some embodiments, it is desired to avoid vaporization (volatilization) of the oil within the separation unit. Sufficient steam should be provided to facilitate oil droplet rise and separation, whereas too much steam may overheat the contents within the separation unit, resulting in oil vaporization.

Embodiments herein thus include control units, control valves, and measurement devices (pressure sensors, temperature sensors, level sensors, flow rate sensors, etc.) configured to control operations of the system. The control system in some embodiments is configured to control steam pressure, steam temperature, and steam flow rates to ensure adequate decontamination of the water while avoiding vaporization of the oil.

In other embodiments, a minor amount of volatilization may be tolerated. For example, a water vapor+oil vapor stream may be recovered via flow line 26, fed to a total condenser (not illustrated), and returned to the separation unit for continued separation of the water and oil.

Control systems useful in embodiments herein may thus be configured to control a temperature of the contaminated fluid within the separator, such as the water column within a separation chamber. Control systems according to embodiments herein may be configured to control one or more of steam temperature, steam pressure, steam flow rate, vapor space composition, contaminated water feed rates, and other variables as may be needed or useful in controlling the separations and performance of the overall system.

As described above, processes for water-oil separations herein utilize solar power to produce steam, which is injected into a gas flotation separator, the steam bubbles facilitating the separation of the water and oil. This system may be used as an alternative to the complicated and tough-to-maintain system for bubble generation used for typical gas flotation systems, and provides a low-cost, environmentally friendly process that can be used to perform the desired separations.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A system for water-oil separations, the system comprising:
    a water-oil separation vessel including:
        a contaminated water inlet, a decontaminated water outlet, and an oil outlet;
        a separation chamber; and
        a bubble distributor disposed within the separation chamber;
    a contaminated water feed pipe fluidly connecting a contaminated water source to the contaminated water inlet of the water-oil separation vessel;
    a water circulation loop, comprising:
        a fluid conduit for withdrawing decontaminated water from the water-oil separation vessel via the decontaminated water outlet;
        a heat exchange tube configured for heating water withdrawn via the decontaminated water outlet;
        a concentrated solar collector for directly or indirectly heating water in the heat exchange tube to produce steam; and
        a fluid conduit configured for transporting the produced steam from the heat exchange tube to the bubble distributor; and
    a fluid conduit for recovering separated oil.

2. The system of claim 1, wherein the bubble distributor comprises a distributor for introducing steam macrobubbles, a distributor for introducing steam microbubbles, or both.

3. The system of claim 1, the system further comprising a molten salt circulation loop, wherein the concentrated solar collector is configured to heat a molten salt, and wherein a heat exchanger is provided for exchanging heat between heated molten salt and water contained in the heat exchange tube.

4. The system of claim 1, wherein the concentrated solar collector comprises a parabolic trough solar collector.

5. The system of claim 1, further comprising a control system configured to control at least one of a temperature of the steam, a pressure of the steam, or a flow rate of the steam.

6. The system of claim 5, wherein the control system is further configured to control a temperature of contaminated water within the separation chamber.

7. The system of claim 1, comprising a second water-oil separation vessel disposed in series with the water-oil separation vessel, the second water oil-separation vessel including:
    a contaminated water inlet in fluid communication with the water-oil separation vessel decontaminated water outlet;
    a decontaminated water outlet;
    an oil outlet;
    a separation chamber; and
    a bubble distributor disposed within the separation chamber.

8. The system of claim 7, wherein the bubble distributor in the second water-oil separation vessel is configured to provide bubbles of a smaller size than the bubble distributor in the water-oil separation vessel.

9. The system of claim 7, further comprising a heat exchanger disposed intermediate the water-oil separation vessel and the second water-oil separation vessel, wherein the heat exchanger is configured to reduce a temperature of a fluid flowing from the water-oil separation vessel decontaminated water outlet to the second water-oil separation vessel contaminated water inlet.

10. A process for water-oil separations using the system of claim 1, the process comprising:
    feeding an oil-water mixture to the water-oil separation vessel;
    circulating water through the water circulation loop and heating the water to generate steam via solar energy captured by the concentrated solar collector;
    distributing the steam in the separation chamber of the water-oil separation as a plurality of bubbles, facilitating separation of oil from water;
    recovering a decontaminated water product stream;
    recovering an oil product stream; and
    feeding a portion of the decontaminated water in the decontaminated water product stream to the water circulation loop.

11. The process of claim 10, wherein the water-oil mixture is a produced water recovered from a wellbore.

12. The process of claim 10, wherein the distributing comprises distributing the steam as micro-bubbles into the separation chamber.

13. The process of claim 10, wherein the distributing comprises distributing the steam as both micro-bubbles and macro-bubbles into the separation chamber.

14. The process of claim 10, wherein heating the water to generate steam comprises heating the water via concentrated solar energy.

15. The process of claim 10, wherein heating the water to generate steam comprises heating a molten salt via concentrated solar energy and heating the water via indirect heat exchange with heated molten salt.

16. The process of claim 15, wherein heating the water to generate steam comprises:
- during daylight hours, heating the water via concentrated solar energy; and
- during nighttime hours, heating the water via indirect heat exchange with heated molten salt.

* * * * *